(12) United States Patent
Thuswaldner et al.

(10) Patent No.: US 9,618,072 B2
(45) Date of Patent: Apr. 11, 2017

(54) SHOCK DAMPING ELEMENT (71) Applicant: RUAG SPACE AB, Gothenburg (SE)

(72) Inventors: Michael Thuswaldner, Linkoping (SE); Anders Helmersson, Linkoping (SE); Orjan Arulf, Linkoping (SE)

(73) Assignee: RUAG SPACE AB, Gothenburg (SE)

( * ) Notice: Subject to any disclaimer, the term of this patent is extended or adjusted under 35 U.S.C. 154(b) by 0 days.

(21) Appl. No.: 14/837,851

(22) Filed: Aug. 27, 2015

(65) Prior Publication Data

US 2016/0061282 A1  Mar. 3, 2016

(30) Foreign Application Priority Data

Aug. 27, 2014  (EP) .................................... 14182431

(51) Int. Cl.
| | | |
|---|---|---|
| F16F 7/00 | (2006.01) | |
| F16F 15/02 | (2006.01) | |
| F16F 1/02 | (2006.01) | |
| B64G 1/22 | (2006.01) | |

(52) U.S. Cl.
CPC ................ *F16F 7/00* (2013.01); *B64G 1/22* (2013.01); *F16F 1/028* (2013.01); *F16F 15/02* (2013.01)

(58) Field of Classification Search
CPC ... F16F 15/02; F16F 1/028; F16F 7/00; B64G 1/22
USPC ................ 267/141, 70, 136, 141.2, 140.5; 188/378–380; 244/173.2
See application file for complete search history.

(56) References Cited

U.S. PATENT DOCUMENTS

| | | | | | |
|---|---|---|---|---|---|
| 3,351,307 | A | * | 11/1967 | Poncel ..................... | B64G 1/50 244/173.2 |
| 4,270,393 | A | * | 6/1981 | Osborne ................. | G01C 19/16 248/179.1 |
| 5,280,889 | A | * | 1/1994 | Amil ........................ | F16F 1/02 248/618 |
| 5,961,078 | A | * | 10/1999 | Edberg .................... | F16F 15/02 244/173.2 |
| 6,012,680 | A | * | 1/2000 | Edberg ................... | B64G 1/641 244/173.2 |
| 6,199,801 | B1 | * | 3/2001 | Wilke .................... | B64G 1/641 244/131 |
| 6,202,961 | B1 | * | 3/2001 | Wilke .................... | B64G 1/641 188/378 |

(Continued)

FOREIGN PATENT DOCUMENTS

| | | |
|---|---|---|
| DE | 4100842 C1 | 5/1992 |
| FR | 2969241 A1 | 6/2012 |

OTHER PUBLICATIONS

Extended European Search Report for Application No. 14182431.8, Completed Mar. 12, 2015.

*Primary Examiner* — Thomas J Williams
*Assistant Examiner* — Mariano Sy
(74) *Attorney, Agent, or Firm* — Brinks Gilson & Lione (57) ABSTRACT

A shock damping element includes a first shock damping structure that includes a multitude of first elements, a multitude of second elements and a first central member. The first elements and the second elements are located at opposite sides of the first central member. The first and second elements extend towards the first central member at a first acute angle (α) relative the first central member and are connected to the first central member. The first and second elements extend in a first direction circumferentially.

18 Claims, 11 Drawing Sheets

(56) References Cited

U.S. PATENT DOCUMENTS

| | | | | |
|---|---|---|---|---|
| 7,288,326 B2* | 10/2007 | Elzey | ............... | C22F 1/006 |
| | | | | 428/179 |
| 7,950,634 B2* | 5/2011 | Koehler | ............ | F16F 1/025 |
| | | | | 267/141.2 |
| 8,444,121 B2* | 5/2013 | Hadden | .......... | F16F 15/0232 |
| | | | | 267/136 |
| 2003/0006341 A1 | 1/2003 | Buder | | |
| 2006/0016928 A1 | 1/2006 | Thomas et al. | | |
| 2009/0102106 A1* | 4/2009 | Ohashi | ............ | F16F 1/025 |
| | | | | 267/153 |
| 2014/0332632 A1* | 11/2014 | Helmer | ............ | B64G 1/641 |
| | | | | 244/173.2 |

\* cited by examiner

SHOCK DAMPING ELEMENT

RELATED APPLICATIONS

This application claims priority to European Application No. 14182431.8, filed Aug. 27, 2014, the contents of which is incorporated herein by reference in its entirety.

TECHNICAL FIELD

The embodiments below relate to a shock damping element having a closed cross section.

BACKGROUND ART

Shock damping structures used in for instance the building of structures which experience both axial and bending vibrations are known in the art. The shock damping structures can be used as interface rings or adapters between a launch vehicle and a payload such as a satellite. These structures experience both axial and bending vibrations and require some kind of damping arrangement in order to absorb vibrations and shocks. Today's damping arrangements all rely on a combination of introducing a weak stiffness, for instance in the form of spring element combined with an energy absorbing material. Today's damping arrangements lower the axial stiffness by the same amount as the bending stiffness. The guidance systems of a launch vehicle require a structure with a high degree of bending stiffness. This limits the use of today's solutions.

There is thus a need for an improved shock damping structure.

SUMMARY

The object of the present application is to provide a novel shock damping element where the previously mentioned problems are at least partly avoided. The shock damping element is characterized by the features in the characterizing portion of claim 1.

The shock damping element comprises a first shock damping structure comprising a multitude of first elements, a multitude of second elements and a first central member. The first elements and the second elements are located at opposite sides of the first central member. The first and second elements extend towards the first central member at a first acute angle relative the first central member and being connected to the first central member. The first and second elements extend in a first direction circumferentially.

One important advantage of the embodiment is that it allows for a possibility to tailor the stiffness in axial and lateral bending more freely. The element ensures that one kind of stiffness is not rigidly connected to the other. I.e., the element allows for the introduction of a tailored weak stiffness in the axial direction without weakening the bending stiffness by the same amount. When the shock damping element experiences a load in axial direction, i.e. tension or compression, the connection between the first and second elements at an acute angle relative the central member causes the first central member to move perpendicular to the direction of the force, i.e. to rotate along a vertical axis in a circumferential direction. When experiencing compression the first central member may move clockwise around the vertical axis and when experiencing tension the first central member may move counter-clockwise, or vice versa. The connection between the first and second elements at an acute angle relative the central member also causes the shock damping element to be able to have a greater bending stiffness than axial stiffness. This is caused by that the first and second elements directs the compressive or tension force to be directed to the first central member which will move perpendicularly to the direction of the applied force. A bending load experienced by the shock damping element causes one part of the shock damping element to experience compression and a part on the opposite side of the shock damping element to experience tension. This means that the part of the first shock damping element being compressed strives to rotate the first central member in a first direction around its vertical axis, while at the same time the part of the first shock damping element being tensioned strives to rotate the first central member in a second direction, opposite the first direction. The opposite movement of the two parts of the first central member essentially hinders movement of the first central member leading to that the bending stiffness is largely maintained.

An element having a closed cross section is intended to mean a three dimensional element having a circular, oval, rectangular or any other geometrically closed shape as cross section. For instance, a cylinder or the frustum of a cone has a closed circular cross section.

Another way of expressing this is that that the eigenfrequency of the axial vibration mode is reduced by a greater amount than the eigenfrequency of the bending vibration mode.

An energy absorbing means may be placed between the first and second elements. This further enhances the damping effect of the shock damping element. The energy absorbing means may be a solid material placed between the first and second elements. It can also be a damping element or component, such as a shock absorber being placed between one or more pairs of first and second element or between one or more of first elements or second elements.

In one embodiment, the first elements and the second elements are made by removing material from a sheet material constituting the shock damping element. The shock damping element may for instance be made of one sheet of material in the form of a cylinder. The first and second elements are in this embodiment formed by that cavities are cut out of the material forming the walls of the cylinder. The first and second elements are formed by the material between the cavities such that they are separated vertically by a circumferential part of the material. The circumferential part makes up the first central member.

In one embodiment, the shock damping element comprises a first circumferential support member. The first elements comprise links being rotatably or fixedly connected at a first end to the first circumferential support member and at a second end to the first central member. The shock damping element further comprises a second circumferential support member. The second elements comprise links being rotatably or fixedly connected at a first end to the second circumferential support member and rotatably or fixedly connected at a second end to the first central member. In this embodiment the shock damping element is a separate part which can be mounted between a launch vehicle and a payload which experience axial, bending, shear and torsion loads. The shock damping element is mounted between the launch vehicle and the payload using known techniques.

The first elements and the second elements form a fishbone-like pattern with the first elements and second elements being rib-shaped being connected to the first central member acting as a spine.

The first and second elements may be connected to the first central member in the shape of links or connected to the first central member by being part of a sheet of material if the elements are cut out of a sheet material constituting the shock damping element. In the latter case there are no separate connections between various parts of the shock damping element. Instead forces are transferred through the material making up the elements to the first central member. The cut out cavities induce a weakness around the first central member leading to the effect as described above.

In one embodiment, the shock damping element comprises a second shock damping structure located inwards from the first shock damping structure. The second shock damping structure comprises a multitude of third elements, a multitude of fourth elements and a second central member. The third elements and the fourth elements are located at opposite sides of the second central member. The third and fourth elements extend towards the seconds central member at a second acute angle relative the central member and being connected to the second central member. The third and fourth elements extend in a second direction circumferentially, wherein the second direction of the third and fourth elements of the second shock damping structure is the same or the opposite of the first direction of the first and second elements of the first shock damping structure and the first and second central members are concentrically arranged.

By adding a second shock damping structure to the shock damping element the effect of the damping of the axial forces can be enhanced. The second shock damping element is arranged concentrically on in inside of the first shock damping element. The direction of the extent third and fourth elements of the second load bearing structure can be the opposite of the direction of the extent of the first and second elements or the same direction. In the case of opposite direction this leads to that the second central member will rotate round the vertical axis in the opposite direction relative the first central member when the shock damping element experiences tension or compression. An energy absorbing means may be placed between the first and second central members to further increase the damping efficiency.

An energy absorbing means may be placed between one or more of: the first and second central members, the first and second elements and the third and fourth elements. This further enhances the damping effect of the shock damping element. Having an energy absorbing means placed between the first central member and the second central member further increases the effect of the damping as the movements of the first and second central members are larger than the movements between for instance two first elements. This will lead to a greater utilization of the energy absorbing means. It is possible to place energy absorbing means between two first, second, third or fourth elements as well as between a first and a second element and a third and a fourth element.

When the first and second elements are made by removing material constituting the shock damping element, the third elements and the fourth elements are made by removing material from a sheet material constituting the shock damping element. In this embodiment, the shock damping element preferably comprises an outer sheet, an inner sheet and an energy absorbing means placed between the outer sheet and the inner sheet. The first and second elements are preferably formed in the outer sheet. The third and fourth elements are preferably formed in the inner sheet.

When the shock damping element comprises a first circumferential support member and links being rotatably or fixedly connected at a first end to the first circumferential support member and at a second end to the first central member and the shock damping element comprises a second circumferential support member and links being rotatably or fixedly connected at a first end to the second circumferential support member and rotatably or fixedly connected at a second end to the first central member, the shock damping element may further comprise links being rotatably or fixedly connected at a first end to the first circumferential support member and at a second end to the second central member. Fourth elements comprising links are rotatably or fixedly connected at a first end to the second circumferential support member and rotatably or fixedly connected at a second end to the second central member. The first elements and the third elements are rotatably or fixedly connected on opposite sides of the first circumferential support member. The second elements and the fourth elements are rotatably or fixedly connected on opposite sides of the second circumferential support member. This embodiment of the shock damping element can also be designed as two separate parts where one part can be placed on the outside of a structural element and another part which can be placed on the inside of a structural element which experiences axial and bending loads. In that case the second shock damping structure comprises a third circumferential support member, the third elements comprising links being rotatably or fixedly connected at a first end to the third circumferential support member and at a second end to the second central member, the second shock damping structure comprises a fourth circumferential support member, the fourth elements comprising links being rotatably or fixedly connected at a first end to the fourth circumferential support member and rotatably or fixedly connected at a second end to the second central member.

When the shock damping element comprises one or more sheets, the material of the sheets may be any material capable of handling the load and deformation.

When the shock damping element comprises links, circumferential support structures and central members, the links, circumferential support structures and central members are made of any material capable of handling the load and deformation. The links, circumferential support structures and central members can be made from the same or different materials in order to further tailor the shock damping element.

The first acute angle and the second acute angle are between 10-80°, specifically between 30-60°, more specifically between 40-50°. The first and second acute angles can be varied depending on the desired characteristics of the shock damping element.

The thickness of the shock damping element over the first and second central member may be larger than the thickness of the shock damping element outside the first and second central member. This is another factor which can be used to tailor the shock damping element. One example of this is that the location of the first and second central member of a sheet of material can be made thicker than the remaining sheet material. Alternatively, the thickness over the first and second central members can be made thinner than the remaining sheet material. Alternatively, the thickness of the material can be made to increase or decrease along the height of the shock damping element, or tangentially.

The shock damping element may be a used as a separate load bearing interface ring or payload adapter for a payload or launch vehicle. The load bearing interface ring is preferably cylindrical or frusto-conical in shape, although other regular or irregular geometric shapes such as a polygonal prisms or truncated pyramids are conceivable.

Using a shock damping element according to the embodiments as a load bearing interface ring for a payload or launch vehicle is advantageous as the bending stiffness of the launch vehicle can be preserved. This allows for more freedom in choosing the axial stiffness suitable for the damping requirements. An advantage with this is that payloads with more sensitive components than can be used today can be launched.

The shock damping element may be a structural element for a space craft, such as a central tube, or as a structural element in a launch vehicle. The same advantages apply as for the use as a load bearing interface ring.

The claims are not limited to space applications. It is also possible for the shock damping element to be used in any load bearing circular structural elements in which it is advantageous to introduce a weak stiffness such that the bending stiffness is maintained while the axial stiffness is reduced.

The number of first, second, third and fourth elements can be used to tailor the axial and bending stiffness of the shock damping element.

One advantage with the embodiments is that it is possible to tailor, i.e. adapt the axial stiffness of the shock damping element while essentially maintaining the bending stiffness. The relationship between the bending stiffness and the axial stiffness can be varied by varying the characteristics of one or more of the parts of the shock damping element as mentioned above.

Although, the embodiments describe a shock damping element, the invention defined by the claims is suitable also for damping vibrations experienced between two components connected by a shock damping element.

DETAILED DESCRIPTION

Figure 1:
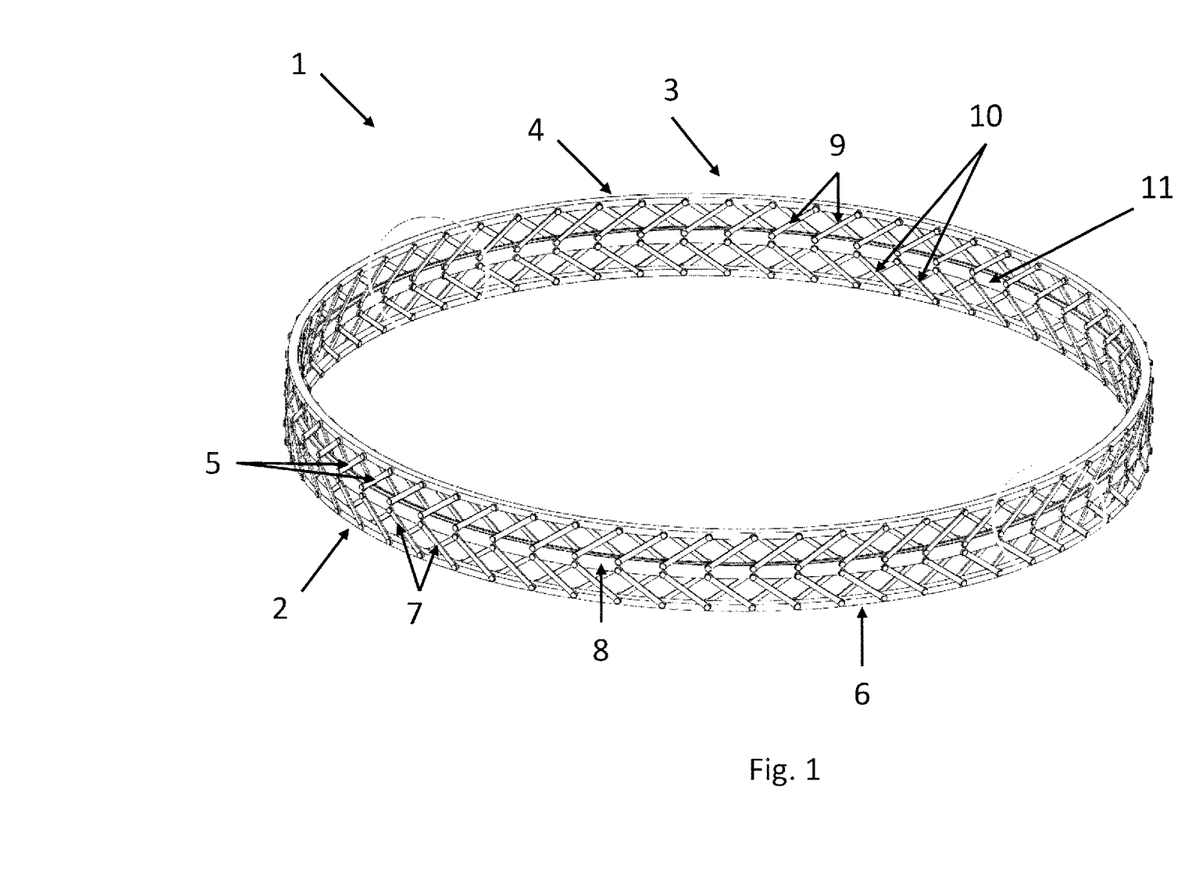
FIG. 1 schematically shows a first example of a shock damping element.

FIG. 1 schematically shows a first example of a shock damping element 1. In the first example, the shock damping element 1 comprises a first shock damping structure 2 and a second shock damping structure 3. The first shock damping structure 2 comprises a first circumferential support member 4 and a multitude of first elements 5. The first shock damping structure 2 further comprises a second circumferential support member 6 and a multitude of second elements 7. The first elements 5 and the second elements 7 are located at opposite sides of a first central member 8, e.g. above and below in a vertical direction. The first elements 5 in this example comprises links being rotatably connected at a first end to the first circumferential support member 4 and at a second end to the first central member 8. The second elements 7 in this example comprise links being rotatably connected at a first end to the second circumferential support member 6 and rotatably connected at a second end to the first central member 8.

The second shock damping structure 3 in this example comprises a multitude of third elements 9 and a multitude of fourth elements 10. The third elements 9 and the fourth elements 10 are located at opposite sides of a second central member 11, e.g. above and below in a vertical direction. The third elements 9 in this example comprise links being rotatably connected at a first end to the first circumferential support member 4 and at a second end to a second central member 11. The fourth elements 10 in this example comprise links being rotatably connected at a first end to the second circumferential support member 6 and rotatably connected at a second end to the second central member 11. The first shock damping structure 2 and second shock damping structure 3 are arranged concentrically around an imagined vertical axis. The first central member 8 and the second central member 11 lie in the same plane. As an alternative the first and second elements 5, 7 and third and fourth elements 9, 10 are fixedly attached with fasteners to the first and second circumferential support member 4, 6 respectively. The shape of the elements can be made to vary in order to tailor the bending and axial stiffness further.

In order to obtain the desired effect the shock damping element is preferably placed such that the first circumferential support member, the first and second central members and second circumferential support member are placed in vertical direction, at least relative the object to which it is attached.

Figure 2A:
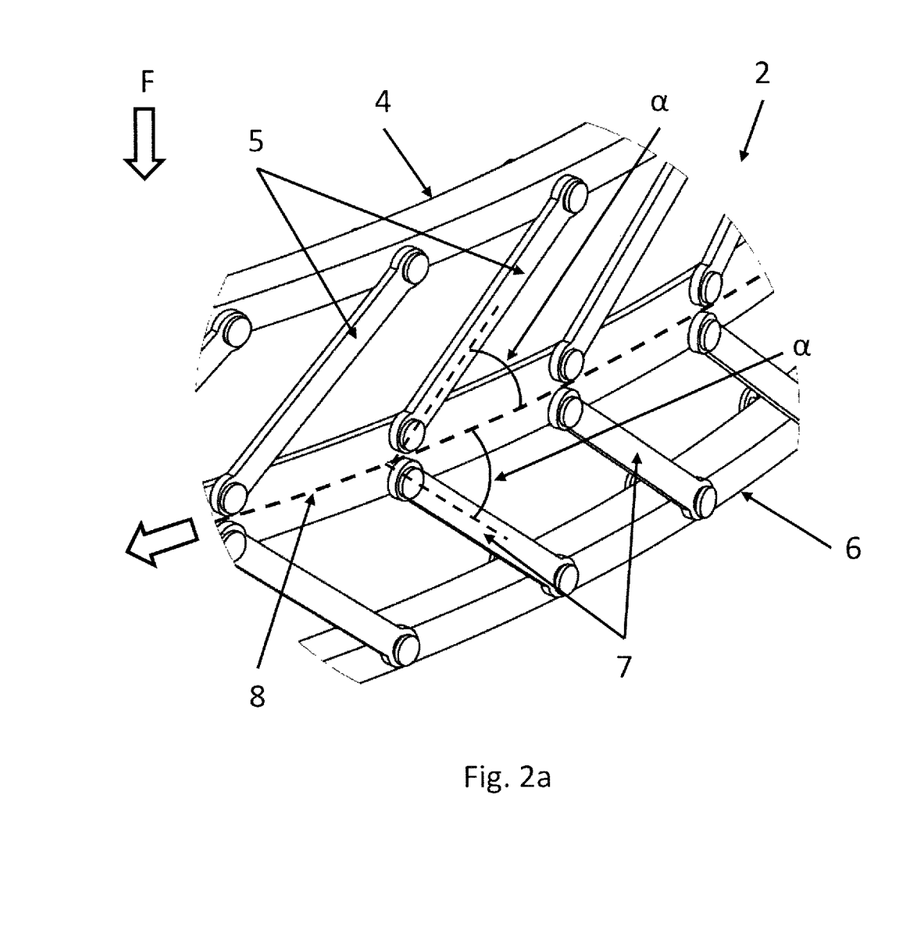
FIGS. 2a and 2b schematically show detailed views of a first example of a shock damping element, FIG. 3 schematically shows an example of bending forces experienced by the shock damping element, FIG. 4 schematically shows a second example of a shock damping element, FIG. 5a-5c schematically shows a detailed view of a second example of a shock damping element, FIG. 6 schematically shows a third example of a shock damping element, FIGS. 7a-7c schematically shows alternative placements of a shock damping element.
Figure 2B:
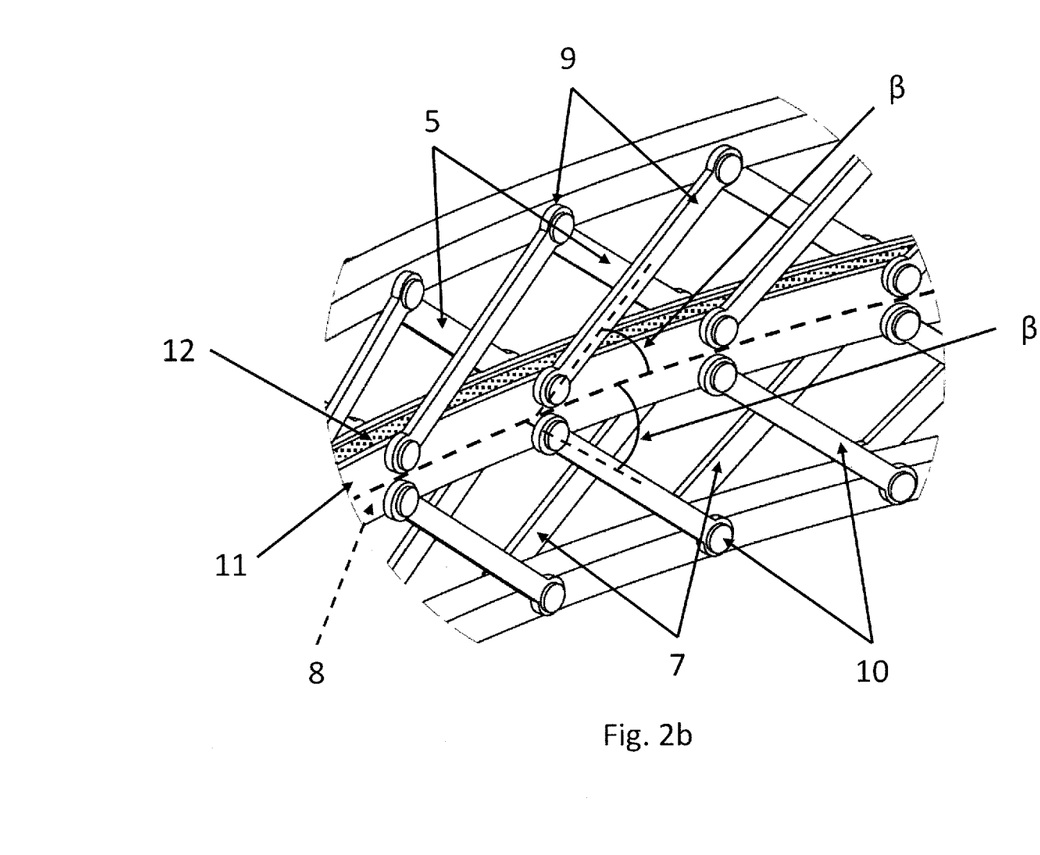

FIGS. 2a and 2b schematically show detailed views of a first example of a shock damping element 1.

FIG. 2a schematically shows a detailed view of the first shock damping structure 2 of the shock damping element 1 shown in FIG. 1. As can be seen the first elements 5 and second elements 7 extend towards the first central member 8 at a first acute angle α relative the first central member 8. The angle α is measured between the tangential extension of the first central member 8 at the second end of the first and second elements 5, 7 respectively and the extension from the first end and the second of the first and second elements 5, 7 respectively. The first elements 5 and second elements 7 extend in a first direction circumferentially, in this example clockwise, or from right to left. When a compressive force F pushes on the shock damping element 1, the first and second elements 5, 7 push the first central member 8 in a direction perpendicular to the compressive force, in this case coinciding with the direction of the first and second elements 5, 7, i.e. in a clockwise direction, as indicated by the arrow. The stiffness of the shock damping element 1 dampens the compressive force F arising from axial shock or vibrations. A tension force would cause the first and second element to pull on the first central member 8 leading to that the first central member 8 moves in a counter-clockwise direction. It is possible for the shock damping element 1 to comprise only the first shock damping structure 2.

FIG. 2b schematically shows a detailed view of the shock damping element 1 of FIG. 1. As can be seen the third elements 9 and fourth elements 10 extend towards the second central member 11 at a second acute angle β relative the second central member 11. The angle β is measured between the tangential extension of the second central member 11 at the second end of the third and fourth elements 9, 10 and the extension from the first end and the second of the first and second elements 5, 7 respectively. The third and fourth elements 9, 10 extend in a second direction circumferentially, opposite the first direction, i.e. counter-clockwise or left to right. An energy absorbing means 12 may be placed between the first central member 8 and the second central member 11 in order to increase the damping effect of the shock damping element 1. The energy absorbing means 12 can be placed continuously or intermittently between the first and second central members 8, 11. The first and third elements 5, 9 and the second and fourth elements 7, 10 respectively can be connected to the first and second circumferential supporting member 4, 6 respectively at the same location using a connection passing through the circumferential supporting members. Alternatively the elements 5, 9 and 7, 10 respectively can each be connected independently on the circumferential supporting members 4, 6.

Figure 3:
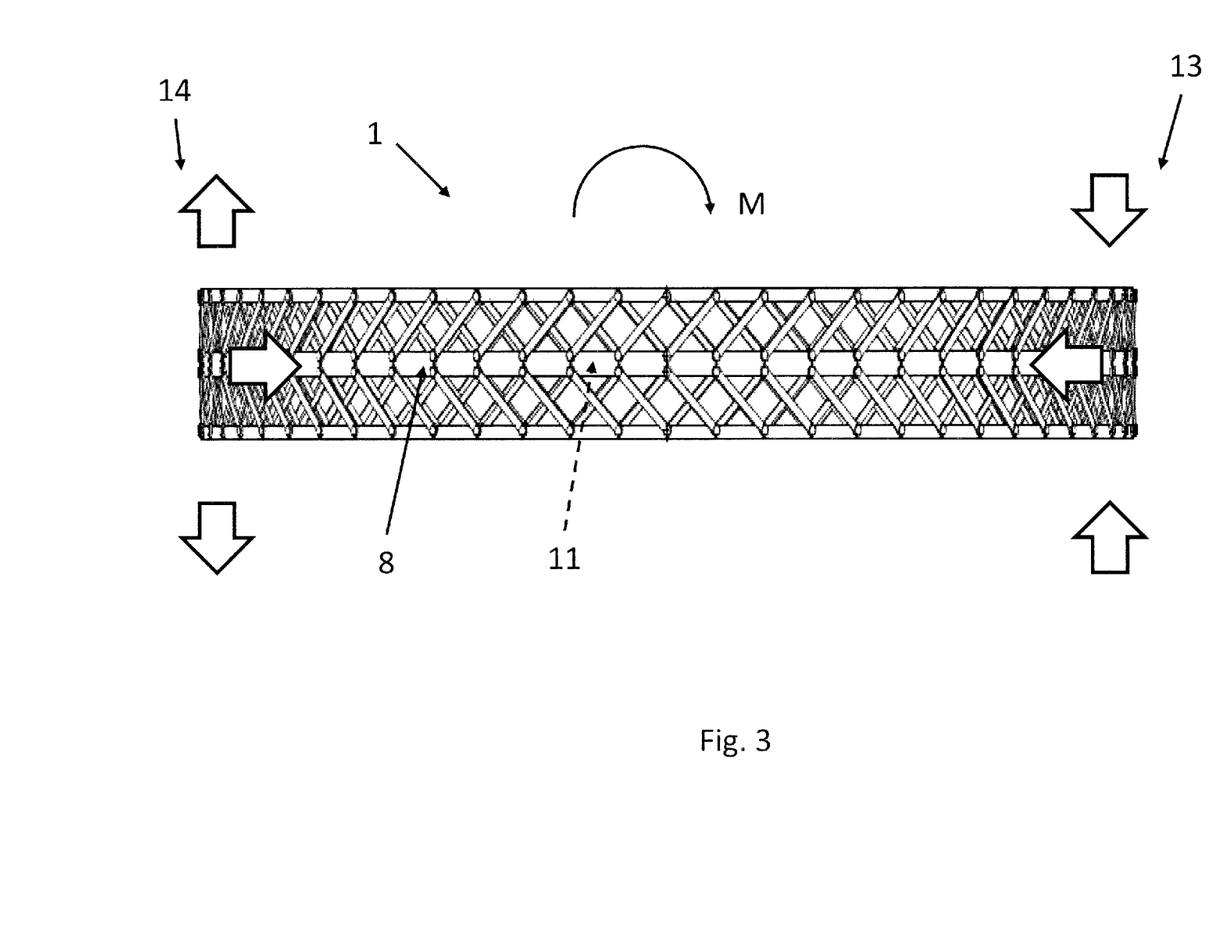

FIG. 3 schematically shows an example of a bending moment M experienced by the shock damping element 1. A bending moment M is applied on the shock damping element 1 towards the right side 13 of the shock damping element 1. The bending force gives rise to a compression of the right side 13 of the shock damping element 1 (indicated by arrows above and below pointing toward the shock damping element 1) and a tension of the left side 14 of the shock damping element 1 (indicated by arrows above and below pointing away from the shock damping element 1). As described above the right side 13 of the first central member 8 moves clockwise due to the compression (as indicated by an arrow pointing towards the left side) and the left side 14 of the first central member 8 moves counter-clockwise due to the tension (as indicated by an arrow pointing towards the right side). This is illustrated in the figure by the arrows. This counteracting movement of the first central member 8 is mirrored by the second central member 11 prevents the bending displacement. With right and left sides are meant sides along an axis extending in the same direction as the applied bending force.

An energy absorbing material is preferably placed between the central members 8 and 11 or between any of the parts 4, 5, 6, 7, 9 or 10 in order to enhance the damping. An elastic material may also be placed between the central members 8 and 11 or between any of the parts 4, 5, 6, 7, 9 or 10 to affect the stiffness.

Figure 4:
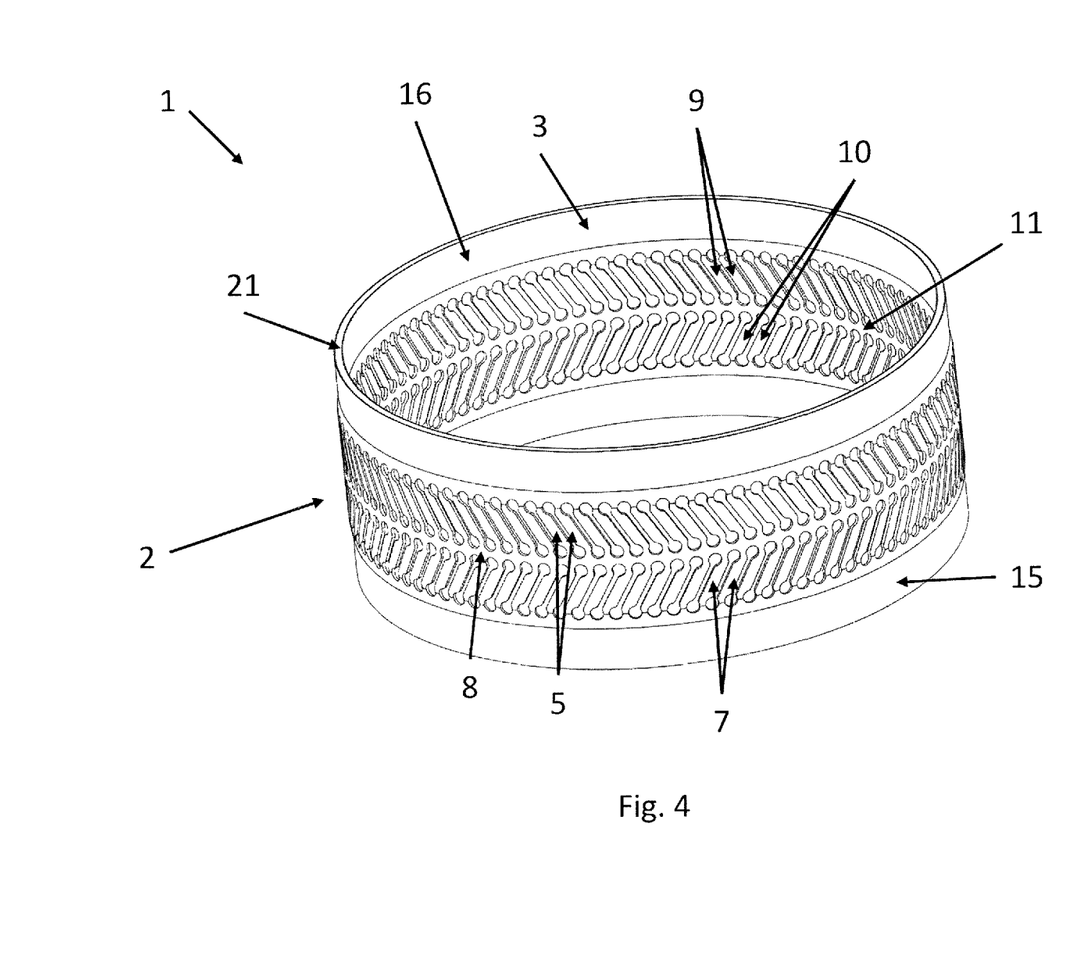

FIG. 4 schematically shows a second example of a shock damping element 1. In the second example the shock damping element 1 comprises a first shock damping structure 2 comprising a multitude of first elements 5, a multitude of second elements 7 and a first central member 8.

The first elements 5 and the second elements 7 are located at opposite sides of the first central member 8. The first and second elements 5, 7 extend towards the first central member 8 at a first acute angle α relative the first central member 8 and being connected to the first central member 8. The first and second elements 5, 7 extend in a first direction circumferentially. The shock damping element 1 further comprises a second shock damping structure 3 comprising a multitude of third elements 9, a multitude of fourth elements 10 and a second central member 11. In this example, the shock damping element 1 comprises an outer sheet 15, an inner sheet 16 and a distancing material 21. An energy absorbing means 12 may be placed between the outer sheet 15 and the inner sheet 16 if the damping needs to be enhanced. The shock damping element 1 is cylindrical. The first and second elements 5, 7 are made by removing material from the outer sheet 15. The third and fourth elements 9, 10 are made by removing material from the inner sheet 16. The energy absorbing means 12 may be exposed through the cut out elements. The shape of the elements can vary and is a design parameter and will depend on the desired specific stiffness and deformation characteristic.

Figure 5A:
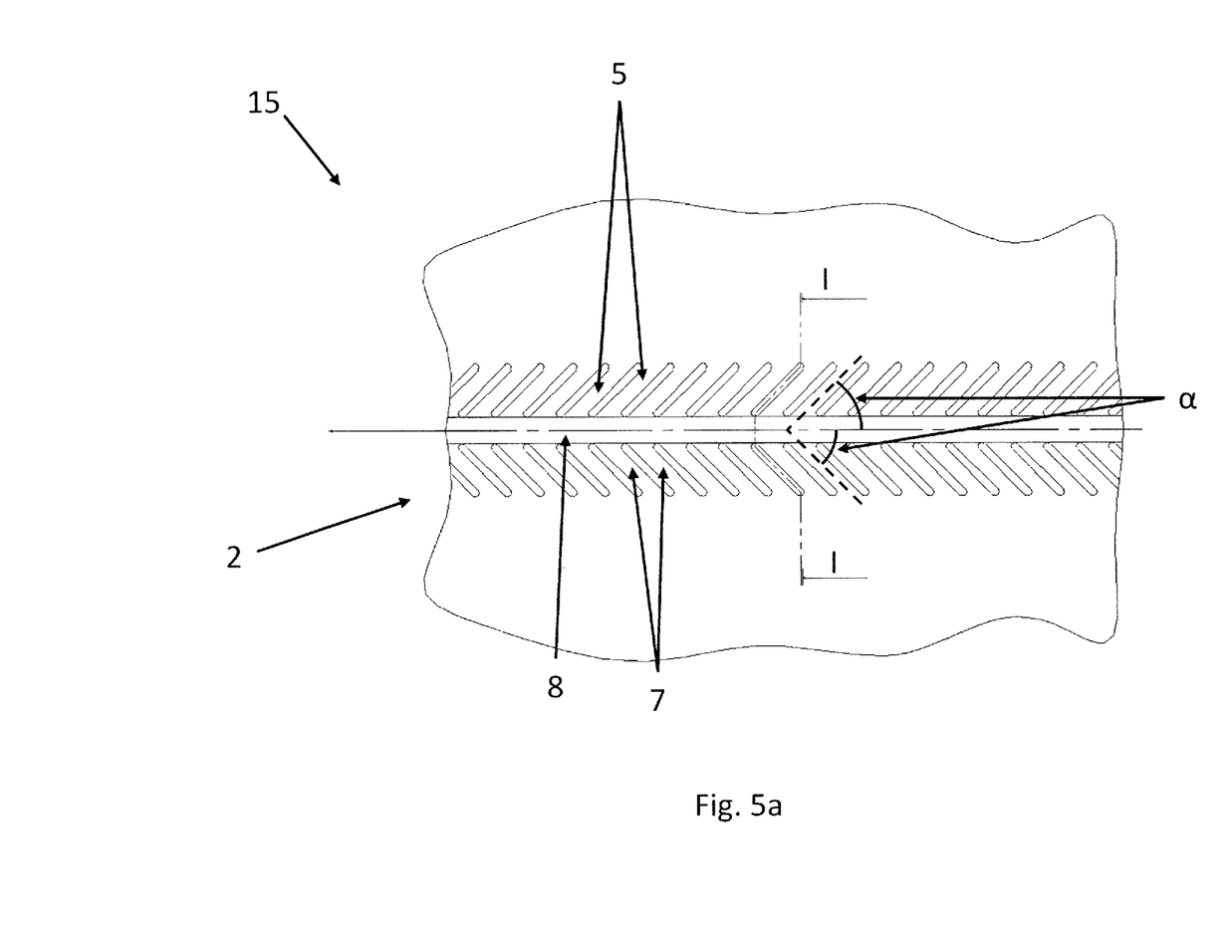
Figure 5B:
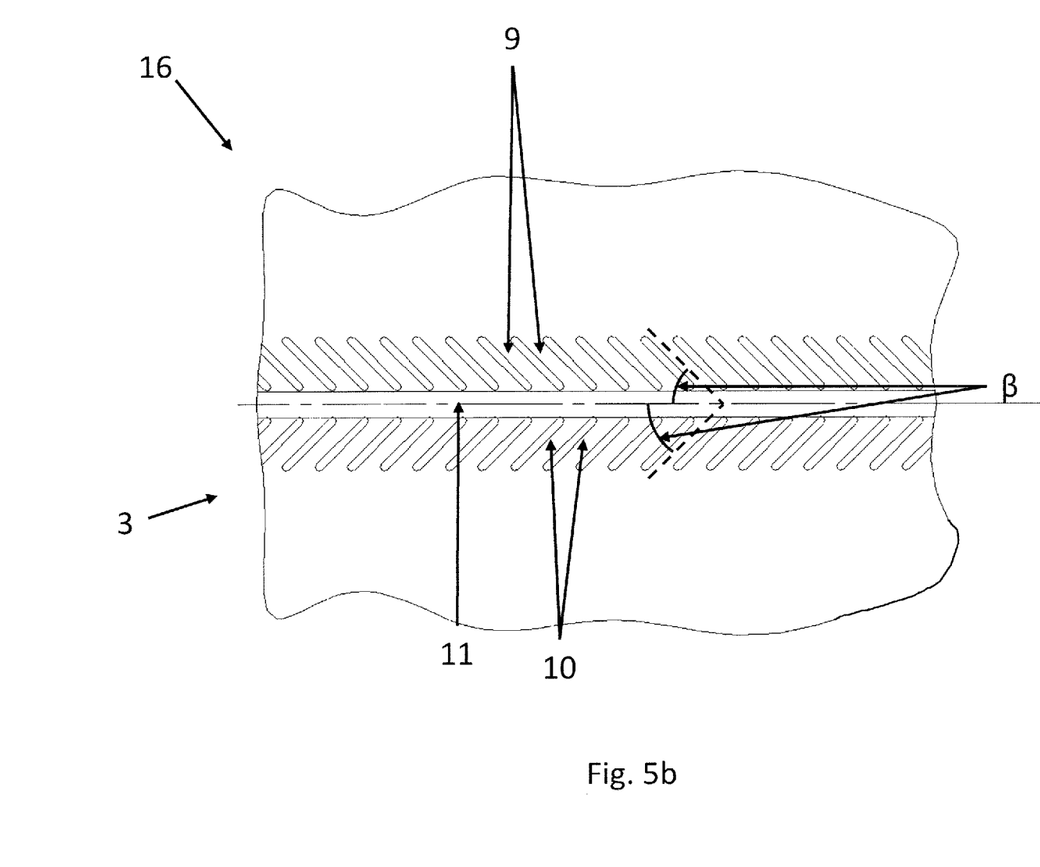
Figure 5C:
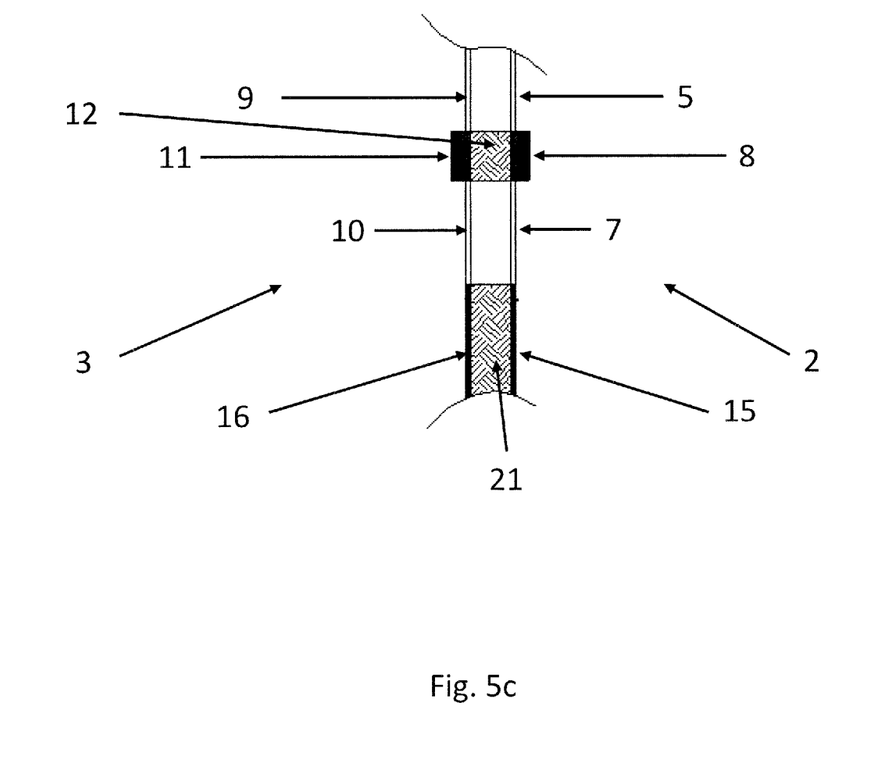

FIGS. 5a-5c schematically shows a detailed view of a second example of a shock damping element 1. FIG. 5a shows a detailed view of the outer sheet 15. The first elements 5 and second elements 7 can be seen to be made by cutting out cavities of the outer sheet 15 and extend towards the first central member 8 at a first acute angle α relative the first central member 8. In this example, the first central member 8 is made up by the sheet material extending between the lowermost part of the first element 5 and the uppermost part of second element 7. The first and second elements 5, 7 extend in a first direction circumferentially, in this example clockwise or right to left. When a compressive force F pushes on the shock damping element 1, the first and second elements 5, 7 direct the compressive force in a way that will push the first central member 8 in a direction perpendicular to the compressive force, in this case coinciding with the direction of the first and second elements 5, 7, i.e. in a clockwise direction, or right to left. The stiffness of the shock damping element 1 dampens the axial shock and/or vibrations. A tension force would cause the first and second element to pull on the first central member 8 leading to that the first central member 8 moves in a counter-clockwise direction. It is possible for the shock damping element 1 to comprise only the first shock damping structure 2.

FIG. 5b shows a detailed view of the inner sheet 16. The third elements 9 and fourth elements 10 can be seen made by cutting out cavities of the inner sheet 16 and extend towards the second central member 11 at a second acute angle β relative the second central member 11. In this example, the second central member 11 is made up by the sheet material between the third and fourth elements 9, 10. The third and fourth elements 9, 10 extend in a second direction circumferentially, in this example counter-clockwise, or left to right. When a compressive force F pushes on the shock damping element 1, the third and fourth elements 9, 10 direct the compressive force in a way that will push the second central member 11 in a direction perpendicular to the compressive force, in this case coinciding with the direction of the third and fourth elements 9, 10, i.e. in a counter-clockwise direction, or left to right. The stiffness of the shock damping element 1 dampens the axial shock and/or vibrations. A tension force would cause the third and fourth element to pull on the second central member 11 leading to that the second central member 11 moves in a counter-clockwise direction.

It is possible for the shock damping element 1 to comprise only the first shock damping structure 2, i.e. only one sheet with the first shock damping structure 2 cut out of it.

FIG. 5c schematically shows a cross section of the shock damping element 1 taken along the section I-I in FIG. 5a. The cross section shows from top to bottom, a first element and a third element, the first and second central members 8, 11, a second element and a fourth element, and the outer sheet 15 and inner sheet 16. Between the outer sheet 15 and inner sheet 16 a distancing material 21 may be placed. An energy absorbing means 12 may be placed between the first and second central members 8, 11. As can be seen from FIG. 5c the thickness of the outer sheet 15 and inner sheet 16 at the position of the first and second central members 8, 11 may be greater than the thickness of the remainder of the shock damping element 1. The thickness can be varied to tailor the axial and bending stiffnesses of the shock damping element 1. The width and/or thickness of the elements can vary by varying the width and of the cavities cut out or the thickness of the sheets.

In the embodiment of the shock damping element shown in FIGS. 4-5c the second shock damping structure is separate from the first shock damping structure.

Figure 6:
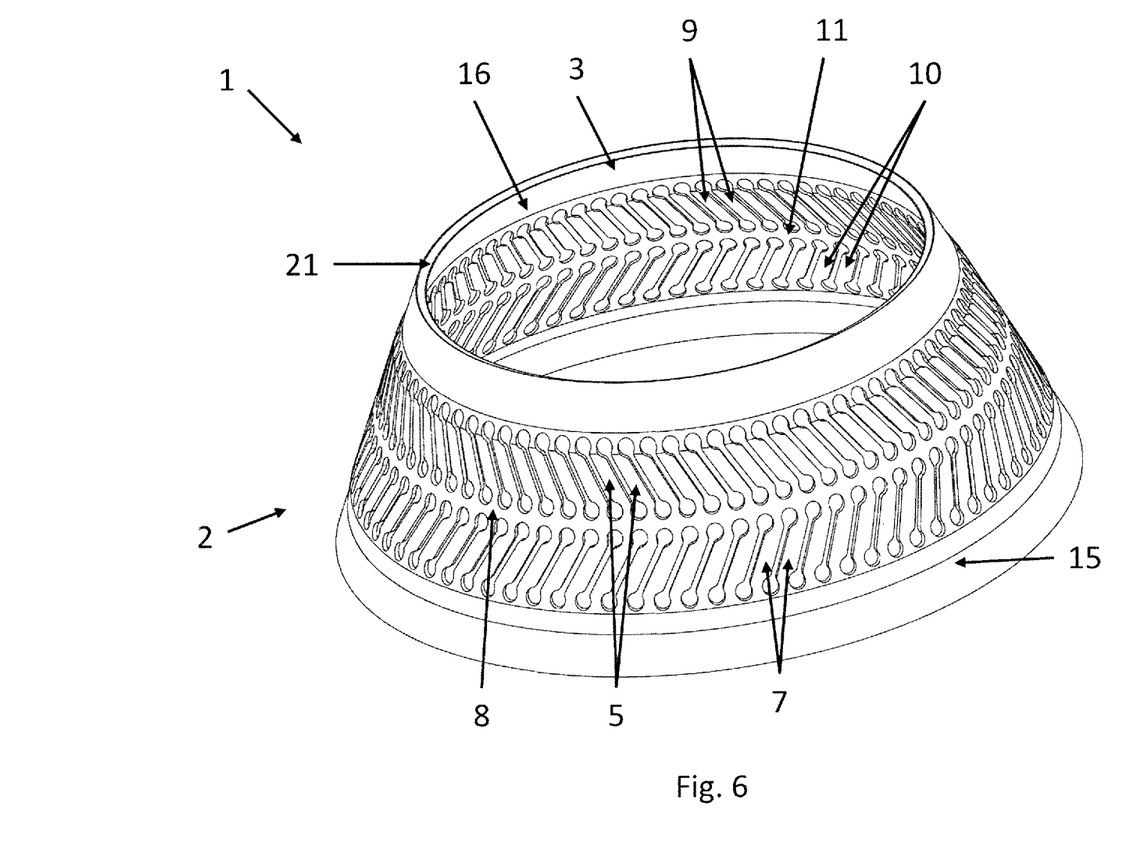

FIG. 6 schematically shows a third example of a shock damping element 1. The third example of the shock damping element 1 is constructed in the same way as the second example described in FIG. 4 with the difference that the shock damping element 1 is frusto-conical in shape.

Figure 7A:
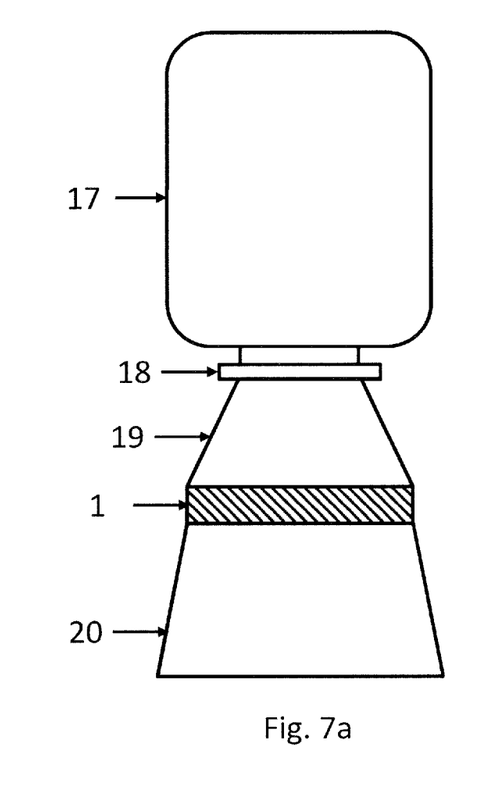
Figure 7B:
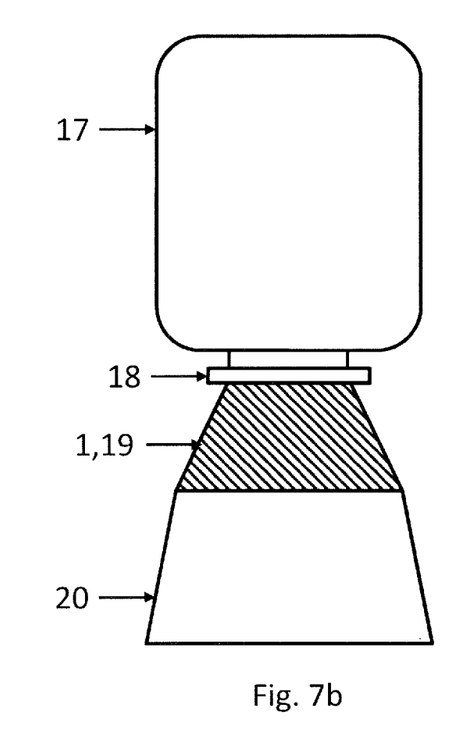
Figure 7C:
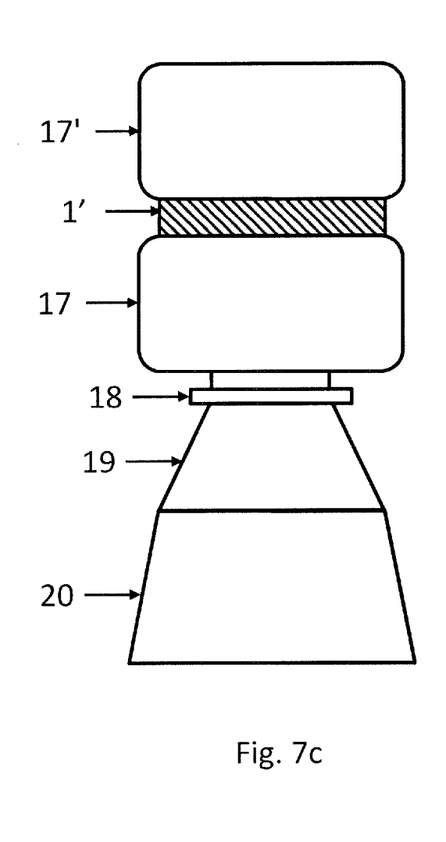

FIGS. 7a-7c schematically show three alternative placements of a shock damping element 1. In FIGS. 7a-7c the shock damping element 1 is used as a shock damping interface ring or a payload adapter for a launch vehicle or space craft. The figures schematically show a top part of a rocket arrangement for carrying satellites or other payloads into orbit.

In FIG. 7a, one payload 17, such as a satellite, sits on top of a separation system 18 which in turn sits on a payload adapter 19. The payload adapter 19 sits on top of a launch vehicle adapter 20. In FIG. 7a the shock damping element 1 is a separate cylindrically shaped interface ring placed between the payload adapter 19 and the launch vehicle adapter 20. An interface ring can also be placed between any two parts of the launch vehicle which experience axial vibrations or shocks.

In FIG. 7b the shock damping element 1 is integrated in the payload adapter 19 and is frusto-conical in shape.

In FIG. 7c, two satellites 17, 17' sit on top of a launch vehicle. The two satellites 17, 17' are separated by a shock damping element 1' which functions as an interface ring between the two satellites.

The two alternatives in FIGS. 7a and 7b can be combined by for instance replacing the payload adapter 19 and shock damping element 1 in FIG. 7a with the integrated payload adapter 19 of FIG. 7b while keeping the separate cylindrical shock damping element 1'.

For instance the invention defined by the claims may be extended to cover more than two shock damping structures being placed concentrically. For instance the shock damping elements of FIGS. 4-6 can be made up by any number of sheets of material, each having their own shock damping structure. The direction in which the elements extend can be the same for two consecutively placed shock damping structures or the direction can be alternated between two consecutively placed shock damping structures.

Reference signs mentioned in the claims should not be seen as limiting the extent of the matter protected by the claims, and their sole function is to make claims easier to understand.

As will be realised, the invention define by the claims is capable of modification in various obvious respects, all without departing from the scope of the appended claims. Accordingly, the drawings and the description thereto are to be regarded as illustrative in nature, and not restrictive.

The invention claimed is:

1. A shock damping element having a closed cross section comprising:
   a first shock damping structure that includes:
      a multitude of first elements;
      a multitude of second elements; and
      a first central member,
   wherein the first elements and the second elements are located at opposite sides of the first central member, the first and second elements extend towards the first central member at a first acute angle (α) relative the first central member and are connected to the first central member, wherein the first and second elements extend in a first direction circumferentially, and
   wherein the shock damping element comprises a second shock damping structure located inwards from the first shock damping structure, the second shock damping structure comprises a multitude of third elements, a multitude of fourth elements and a second central member, wherein the third elements and the fourth elements are located at opposite sides of the second central member, the third and fourth elements extending towards the second central member at a second acute angle (β) relative the central member and being connected to the second central member, wherein the third and fourth elements extend in a second direction circumferentially, wherein the second direction of the third and fourth elements of the second shock damping structure is the same or the opposite of the first direction of the first and second elements of the first shock damping structure and the first and second central members are concentrically arranged.

2. The shock damping element according to claim 1, wherein an energy absorbing device is placed between the first and second elements.

3. The shock damping element according to claim 2, wherein the first elements and the second elements are cut out of a sheet material constituting the shock damping element.

4. The shock damping element according to claim 2, wherein the shock damping element comprises a first circumferential support member, the first elements comprise links that are rotatably or fixedly connected at a first end to the first circumferential support member and rotatably or fixedly connected at a second end to the first central member, the shock damping element further comprises a second circumferential support member, the second elements comprising links being rotatably or fixedly connected at a first end to the second circumferential support member and rotatably or fixedly connected at a second end to the first central member.

5. The shock damping element according to claim 2, wherein the third elements and the fourth elements are cut out of a sheet material constituting the shock damping element.

6. The shock damping element according to claim 2, wherein an energy absorbing device is placed between one or more of: first elements, second elements, third elements, fourth elements and the first and second central members.

7. The shock damping element according to claim 2, wherein the first acute angle (α) is between 10-80°.

8. The shock damping element according to claim 1, wherein the first elements and the second elements are cut out of a sheet material constituting the shock damping element.

9. The shock damping element according to claim 1, wherein the shock damping element comprises a first circumferential support member, the first elements comprise links that are rotatably or fixedly connected at a first end to the first circumferential support member and rotatably or fixedly connected at a second end to the first central member, the shock damping element further comprises a second circumferential support member, the second elements comprising links being rotatably or fixedly connected at a first end to the second circumferential support member and rotatably or fixedly connected at a second end to the first central member.

10. The shock damping element according to claim 9, wherein the shock damping element comprises a second shock damping structure located inwards from the first shock damping structure, the second shock damping structure comprises a multitude of third elements, a multitude of fourth elements and a second central member, wherein the third elements and the fourth elements are located at opposite sides of the second central member, the third and fourth elements extending towards the second central member at a second acute angle (β) relative the second central member and being connected to the second central member, wherein the third and fourth elements extend in a second direction circumferentially, wherein the second direction of the third and fourth elements of the second shock damping structure is the same or the opposite of the first direction of the first and second elements of the first shock damping structure and the first and second central members are concentrically arranged, wherein the third elements comprising links being rotatably or fixedly connected at a first end to the first circumferential support member and rotatably or fixedly connected at a second end to the second central member, the fourth elements comprising links being rotatably or fixedly connected at a first end to the second circumferential support member and rotatably or fixedly connected at a second end to the second central member.

11. The shock damping element according to claim 1, wherein the third elements and the fourth elements are cut out of a sheet material constituting the shock damping element.

12. The shock damping element according to claim 11, wherein the second acute angle (β) is between 10-80°.

13. The shock damping element according to claim 1, wherein the second acute angle (β) is between 10-80°.

14. The shock damping element according to claim 1, wherein an energy absorbing device is placed between one or more of: first elements, second elements, third elements, fourth elements and the first and second central members.

15. The shock damping element according to claim 1, wherein the first acute angle (α) is between 10-80°.

16. The shock damping element according to claim 1, wherein the shock damping element is used as a separate load bearing interface ring for a payload or launch vehicle.

17. The shock damping element according to claim 16, wherein the load bearing interface ring is cylindrical or frusto-conical.

18. The shock damping element according to claim 1, wherein the shock damping element is a structural element for a space craft, or a structural element in a launch vehicle.

* * * * *